US006986127B1

(12) United States Patent
Newlin et al.

(10) Patent No.: US 6,986,127 B1
(45) Date of Patent: Jan. 10, 2006

(54) DEBUGGING APPARATUS AND METHOD FOR SYSTEMS OF CONFIGURABLE PROCESSORS

(75) Inventors: John Newlin, Sunnyvale, CA (US); Albert Wang, Los Altos, CA (US); Christopher M. Songer, San Jose, CA (US)

(73) Assignee: Tensilica, Inc., Santa Clara, CA (US)

( * ) Notice: Subject to any disclaimer, the term of this patent is extended or adjusted under 35 U.S.C. 154(b) by 224 days.

(21) Appl. No.: 09/680,126

(22) Filed: Oct. 3, 2000

(51) Int. Cl.
*G06F 9/44* (2006.01)

(52) U.S. Cl. .................... 717/135; 717/139; 717/127; 716/4; 700/2

(58) Field of Classification Search ............... 717/125, 717/128, 131–133, 124, 127, 135, 139; 712/209, 712/227; 714/10–12, 37, 38, 45, 46; 716/4, 716/17; 700/2
See application file for complete search history.

(56) References Cited

U.S. PATENT DOCUMENTS

| 5,450,586 | A | * | 9/1995 | Kuzara et al. ............... 717/124 |
| 5,854,929 | A | * | 12/1998 | Van Praet et al. .......... 717/156 |
| 5,870,588 | A | * | 2/1999 | Rompaey et al. ............. 703/13 |
| 5,896,521 | A | * | 4/1999 | Shackleford et al. .......... 703/21 |
| 6,142,683 | A | * | 11/2000 | Madduri ...................... 717/128 |
| 6,587,995 | B1 | * | 7/2003 | Duboc et al. ................... 716/4 |
| 2001/0025363 | A1 | * | 9/2001 | Ussery et al. ................... 716/1 |
| 2001/0032305 | A1 | * | 10/2001 | Barry ........................... 712/34 |

OTHER PUBLICATIONS

Hogl, H., Kugel, A., Ludvig, J., Manner, R., Noffz, K.H., Zoz, R., "Enable ++: A Second Generation FPGA Processor", 1995 IEE p. 45-53, retrieved from IEEE database May 1, 2003.*

Kirovski, Darko, Lee, Chunho, Potkonjak, Miodrag, Mangione-Smith, William H., "Application-driven Synthesis of Memory-Intensive Systems-on-Chip", 1999 IEEE, p. 1316-1326, retrieved from IEEE database May 1, 2003.*

Winegarden, Steven, "A Bus Architecture Centric Configurable Processor System", 1999 IEEE, p. 627-630, retrieved from IEEE database May 1, 2003.*

Tornado API 2.0 Programmer's Guide, *"Tornado Architecture"*, WindRiver Systems©, Ed. 1, (May 6, 1999) pp. 1-14.

Tornado 2.0 User's Guide, *"browser,"* Chpts 7 & 8, pp. 207-280.

Tensilica, Inc. *"On-Chip Debug Mode,"* User's Guide, Chpts 2-5, pp. iii-64, Issue date, Sep. 2000.

Tensilica, Inc. *Xtensa™ Application Specific Microprocessor Solutions*, Overview Handbook, Chpts 1-8, Issue date, Feb. 2000, pp. iii-58.

Tensilica™, *"Instruction Extension (TIE) Language,"* Reference Manual, Chpts. 1-18, pp. 3-68, Issue date, Feb. 2000.

Tensilica, Inc. *"Xtensa™ Instruction Set Architecture (ISA),"* Reference Manual Chpts. 1-15, pp. iii-580, Issue date, Feb. 2000.

* cited by examiner

*Primary Examiner*—Tuan Dam
*Assistant Examiner*—Mary Steelman
(74) *Attorney, Agent, or Firm*—Pillsbury Winthrop et al (57) ABSTRACT

A debugging system and debugging techniques for configurable processors remove the requirement of foreknowledge of specific configurable processor information from components of the debugging system where obtaining that foreknowledge is costly. The system is part of an environment that generates a processor where the proper information is generated in the right forms for such use.

20 Claims, 2 Drawing Sheets

DEBUGGING APPARATUS AND METHOD FOR SYSTEMS OF CONFIGURABLE PROCESSORS

CROSS-REFERENCE TO RELATED APPLICATIONS

This application is related to U.S. patent application Ser. Nos. 09/246,047 to Killian et al., now U.S. Pat. No. 6,477,683; Ser. No. 09/323,161 to Wilson et al.; Ser. No. 09/192,395 to Killian et al., now U.S. Pat. No. 6,282,633; Ser. No. 09/322,735 to Killian et al. now U.S. Pat. No. 6,477,697; Ser. No. 09/506,502 to Wang et al.; and Ser. No. 09/506,433 to Songer et al., all of which are hereby incorporated by reference.

BACKGROUND OF THE INVENTION

1. Field of the Invention

The present invention is directed to software development tools for processors and collections of processors that have easily configurable features. In particular, the present invention is directed to software development tools that observe and display the state of a configurable processor or collections of such processors.

2. Background of the Related Art

This invention relates to configurable processors as described in the above-referenced Wang et al. application. To summarize, most processor architectures are fixed. The instructions that a processor can execute are fixed, or limited to a small set of variations, and the information, or state, that they maintain is also fixed or limited to a small set of variations. There are new processors, however, that allow the user to change the architecture of the processor including, but not limited to, addition of instructions and of state. This invention relates to the field of configurable processors. Specifically, the configurability of a processor poses certain problems in software development tools.

This invention also relates to the field of embedded software development. Many computer systems have a CRT for displaying information, a processor, some memory, some sort of fixed storage, a keyboard and other peripherals. These computer systems are equipped to easily display information to the user. Further, they tend to be able to store, run and display many different programs simultaneously. For example, users of Windows computers can run and view many different software programs at the same time.

Other computing systems often have far less hardware associated with them and are far less capable. They often have neither a monitor, a keyboard nor a disk drive. In the simplest case, they may even be completely implemented on a single piece of silicon. Often these systems are capable of storing and running only a single program and have little capability for the visual display of information. Such computing systems are commonly called "embedded systems" because they are embedded in some other system.

Software rarely works properly in its first revision and software developers use a variety of software tools to be able to observe and diagnose software problems. One of the most essential of these tools is a "debugger." A software program is written in program code, hereinafter referred to as code. Code describes both state and operations to be performed on that state. Generally, the user of a software program cannot view the complete state of that program. This is especially true of embedded software programs. Debuggers allow the software developer to view that state as well as how the state is changed by the operations that are performed on it.

Certainly, debuggers are not the only software development tools that require access to the state of the processor. Though they serve as good example of this class of tool, certain other types of software tools also face the same problems that are faced by debuggers. For example, monitors provide direct visibility to the state of the processor without understanding of the programmatic context and so require this information. Silicon co-verification tools also need this information. Real-time trace capture solutions can need this information. All of these, like debuggers, are generally trying to display state of the processor to the user and some of them are unique—and so do not fall into some particular class of software application. Take as a concrete example the software development environment that is provided by WindRiver in the Tornado 2.0 product. This environment is composed of a variety of different tools. One of these tools is a debugger called CrossWind. But Tornado 2.0 also contains a tool called the "Browser" that allows visibility to the state of the processor. Another tool provided with Tornado 2.0 is called "WindShell" and, again, allows the user to access and view the state of the processor.

In the remainder of this document, the term "debugger" is used to denote any software tool that requires knowledge of the state of the processor to correctly perform its function, whether it performs a debugging function as such is commonly known in the art or not.

The processor and surrounding hardware maintain the state of the program. Some of the state is held in registers that are in the processor, but some of the state can be held in memory or even disk or device registers. So, viewing the state of the program requires viewing the state of the processor and the surrounding hardware. Consequently, tools of this type must be able to access the state of the processor.

The state of software running on a traditional computer system can be viewed by debugging programs running on the same traditional computer system. This is because the computer system is capable of executing and displaying the output of several programs simultaneously. Embedded systems are usually not capable of running and displaying a debugging program. As a result, embedded systems are usually debugged remotely. A remotely debugged system does not itself execute the debugger software but instead provides some mechanism for debugging software running on another computer system to query information about the state of the system. There are a variety of mechanisms that are used to access the state of the processor in remotely debugged systems, but they generally fall into one of three classes.

The first class of mechanisms involves the software tool, a communication channel to the processor and a program called a monitor that runs on the processor. Conceptually, processors generally execute instructions that are referenced by address. The address of the currently executing instruction is called the program counter and the processor executes a series of instructions (a program) by executing instructions from different addresses. The processor executes the monitor by the program counter pointing to one of the addresses containing the monitor. The processor then uses its standard instruction execution mechanism to execute the instructions in the monitor. The monitor retrieves the state of the processor and sends that state of the software tool through the communication channel.

The need to execute the monitor through the standard mechanism of instruction fetch limits the information that can be returned to the software tool. Because the monitor itself uses much of the processor to execute, there are times where the processor is in a condition that the monitor cannot be executed, and therefore, cannot make the state visible to a software tool.

To understand this, consider the debug monitor used by systems running the WindRiver VxWorks operating system. This operating system uses a debug monitor that runs as a task under the operating system. Because the debug monitor runs as a task, it can only report information to the debugging software tool when a task is allowed to run. The operating system does not allow tasks to run when tasks of a higher level are running or when interrupts are being handled. The debug monitor task is also not able to run until a certain point in the initialization process. Consequently debuggers using this debug monitor cannot debug code that is run during the early phases of initialization, that is handling interrupts or that is running at a higher priority than the debug monitor task.

These limitations of monitor programs substantially affect the ability of the debugging tool to aid in diagnosing errors. The other mechanisms to view the state of the processor help to address this limitation.

Before considering the next mechanism, consider the implications of configurable processors (such as those described in the above-referenced applications) for monitor programs. Access to the state of the processor can become problematic in the case of a configurable processor because a monitor, which is responsible for sending state of the processor to the communication channel, must itself know about the state of processor. This problem has been solved in the past by generation of a new monitor for each different processor configuration by the processor generator. The initial release of the Xtensa processor dealt with generation of the monitor in this way. Further, multiple versions of the WindRiver monitor were created for the analogous problem of Intel 486 processors with and without floating point instructions.

This too has problems. Monitor programs are generally stored in ROM or EPROM devices. Programming these devices with a new version of a program generally consumes either additional time or money or both. Further, monitor programs must exist in the same address space as the program to be debugged. A dynamically generated monitor program will vary in its size. Such variation requires changes in additional software for the system to be able to optimally use the available memory space. The present invention addresses this problem.

The second class of mechanism for a remote debugger to access the processor uses special hardware included in the processor for accessing the state of the processor. Many configurable CPUs offer an optional debugging module that allows the normal instruction fetch mechanism to be replaced by a different method that allows an outside agent to specify the instructions to be executed by the CPU. This hardware feature will hereafter be referred to as an "instruction-insertion" feature since it allows an external agent to directly insert instructions to be executed into the processor. Recall that the job of a monitor program is to determine what state to retrieve; retrieve that state; and then put that state into the communication channel. The monitor must do all of these operations using the normal mechanisms of the processor. The instruction-insertion feature allows the determination of state to be done remotely. Further, it generally simplifies the operations performed on the processor which are required to retrieve the state and move that state into the communication channel.

While instruction-insertion systems contain hardware features that do simplify the problems that software must solve, some of the problems that must be solved are simply moved from the processor being viewed to the processor running the debugging software tool. For example, while the processor being viewed no longer has to store the instructions for retrieval of the state of the processor or execute them in the standard mechanism, those instructions must be inserted by the external agent and hence must be available to that agent.

That agent then has the same issues with a configurable processor that a monitor has. Specifically, the external agent (the remote debugging software) must have available the instructions to retrieve and view the state of the processor as well as the instructions to modify the state of the processor. But these instructions will vary depending on the state of the processor. The present invention offers a solution to this problem.

Before moving to the next class of remote-debugging mechanism, there is one more point to make for remote-debugging using instruction insertion mechanisms. Instruction-insertion remote debugging solutions may use more than one additional computing system. Because instruction-insertion mechanisms require specialized hardware interfaces to access their functionality, that interface is sometimes handled by a different computing system. In this situation, a computing system running the software debugging tool has a communication channel to a server software program that has a different communication channel to the instruction-insertion mechanism. The role of this server program is to translate requests from the software debugging tool into commands to the instruction-insertion mechanism. The server software faces some of the problems faced by the monitor program in this system. The server software must know about the new processor state and new instructions to access that state. One solution to this problem is to rebuild the server software for each processor. But again, the server software faces some of the same issues of convenience and efficiency. The present invention offers a solution to this problem.

The final class of mechanism for a remote debugger to access the state of the processor is through use of direct state scanning. Some hardware options allow the state of the processor to be read directly out of the processor without execution of any instructions (inserted or otherwise).

Fabrication of application-specific chips makes the use of configurable processors possible. Often these application-specific chips will have more than one processor on them. The system designer determines the number of processors in this collection and the arrangement of those processors and their relationship to non-processor elements. Remote software debugging solutions must work in this type of environment. This invention solves problems for debugging software that arise from this environment.

SUMMARY OF THE INVENTION

The present invention has been made with the above problems of the prior art in mind, and it is an object of the present invention to provide a method that allows a single monitor program to support a variety of processor configurations that have different processor state and instructions.

It is a further object of the present invention to provide a method that allows a single instruction-insertion server program to support a variety of processor configurations that have different processor state and instructions.

It is a further object of the present invention provide a method that allows a remote debugging solution to work for collections of processors, regardless of the number or arrangement of the elements in the processing system.

It is another object of the present invention to provide a system and method which permits the state of configurable embedded processors to be easily read, manipulated and debugged by a debugging system.

It is yet a further object of the present invention to provide a system and method which permits single tasking processor state to be easily read, manipulated and debugged by a debugging system.

It is still another object of the present invention to provide a system and method which permits reading and manipulation of processor state and other debugging functions in a processor which has a configurable architecture and a variable state structure.

It is a further object of the present invention to provide a system and method which minimizes target processor debugging instruction execution in a debugging system.

It is another object of the present invention to provide a system and method which can perform debugging operations on a configurable processor or system containing configurable processors in spite of active interrupts, high priority level interrupt routines, and initialization programs.

It is still a further object of the present invention to provide a system and method for debugging a processor which can accommodate a wide variety of types of processor state.

It is yet another object of the present invention to provide software for debugging a configurable processor system which does not need to be reconfigured or recompiled for different configurations of the processor.

DETAILED DESCRIPTION OF PRESENTLY PREFERRED EXEMPLARY EMBODIMENTS

In perhaps its broadest aspect, there are two facets to the present invention. First, a preferred embodiment of the present invention provides a software system that includes debugging software capable of transmitting instruction sequences for processor state access to either monitor or instruction-insertion server software. Second, a preferred embodiment of the present invention provides a state access mechanism that at run-time reads and understands the structure of a multi-element processing system to allow debugging software to individually identify and access the state of the elements.

In a preferred embodiment of the present invention, a version of the GDB debugger from the GNU family of open source software development tools is able to remotely debug configurable Xtensa processors either individually or in a system of processors. This version of GDB is able to do so without changes to either the monitor program or the instruction-insertion server. It does this using information created with the Xtensa configurable processor development system. The processors themselves are preferably created with the Xtensa configurable processor development system of Tensilica, Incorporated of Santa Clara, Calif. which is generally described in the aforementioned patent applications.

Hereinafter, "GDB" will denote a version of GDB modified according to the teachings of the present invention.

Single Core Debugging

Debugging a single configurable core with GDB explores the first facet of this invention. As described in the above-cited applications, the processor generator creates the configurable core with input from the user. This input from the user includes a definition of additional processor state to be included in the processor as well as the instructions that move that state into memory.

The additional state and register information is described in the TIE language as documented in the Tensilica TIE Reference Manual, incorporated by reference. As a part of the TIE compilation process, the TIE compiler parses the language and identifies the loadi and storei directives included in the information. These directives give the TIE compiler the information necessary to know how to save and restore a given piece of additional processor state.

The load or store sequence for additional state can itself require the use of other pieces of additional state. As an example, consider a case where the user has declared two register files A and B. The store instructions for register file A use the standard Xtensa address registers for the memory address to which to store. However, the store instructions for register file B use the values of register file A for the memory address to which to store. Therefore, the store of a register from register file B first requires the store of a register from register file A.

The TIE compiler generates this dependency information and encodes it in the form of several dynamically loadable libraries called libcc's. A libcc is a library that can be loaded at program execution time by other software libraries. It includes information that is processor-specific. In particular, libcc contains information regarding the save and restore information and sequences for given registers as well as the name and size information. It is worth noting that the syntax and semantics of the TIE language require that the register file save dependencies not be circular. The TIE compiler will generate an error in the presence of loadi/storei directives that create a circular dependency graph.

GDB calls a library called libdb for information about a given processor configuration. Libdb is C library that has functions that provide information about the state of the processor. This library is compiled into a library that is used by an application that wants to access the information. Consider the following example of GDB's use of libdb. First, we will look at the initialization of libdb as GDB gets the register information for a particular processor:

```
static void
init_libdb ( )
{
    int index = 0;
    g_debug_object = xtensa_init_debug_object (
xtensa_default_params ) ;
    NUM_LIBDB_REGS = xtensa_get_register_count (
g_debug_object ) ;
    for (index = 0; index < NUM_LIBDB_REGS; ++index)
    {
        libdb_reg_map[index] = xtensa_get_register_info(
g_debug_object, index) ;
    }
}
```

Note that the debugger does not have to know anything a priori about the registers that are in the machine. Instead, it is getting all of the register information from libdb. (In the above code sequence, the following calls were libdb calls: xtensa_init_debug_object,xtensa_get_regsiter_count and xtensa_get_reg_info.)

Once the initialization has been performed, information about the processor can be acquired from libdb. For example, the following code snippet looks up register information by register name:

reg_map[n]
   .libdb_number=xtensa_find_register_by_name(g
   _debug_object, reg_map[n].name);

This library, in turn, loads and calls the libcc's produced by the TIE compiler. Libdb is able, at the request of GDB, to generate instruction sequences to save and restore any piece of state that has been added to the processor.

Before dealing with another example, let us discuss at a high level what happens. If each of the register files is considered a node and each dependency considered a directed edge from one node to another, then the dependencies of the save and restore instructions form a directed acyclic graph (DAG) (recall that the TIE compiler has guaranteed that the dependencies are acyclic). Libdb forms the instruction sequence to save and restore each piece of state by depth-first traversal of the DAG (starting at state to be saved and/or restored). In this depth-first traversal, each child node is visited and then the instructions for that node are generated. A given set of instructions can have multiple representations. The assembly source code for the instructions is one form of those instructions, but the processor cannot execute this form. The processor can only execute the machine form of these instructions. So, libdb generates the machine form and makes that form available to GDB.

Consider the following example. A particular TIE coprocessor has the following register file and compiler type definitions (an explanation of the TIE language may be found in, e.g., the above-referenced Tensilica TIE Reference Manual):

regfile vec 160 16 v
regfile align 112 4 u
ctype vec8x20 160 128 vec
ctype align 128 128 align These statements declare two register files vec and align. The register file vec is assigned the ctype vec8x20 and align is assigned the ctype align. These types have the following associated loadi and storei directives.

```
proto align_loadi {out align u, in align* s, in immediate o} {vec8x20 t} {
    LV16.I       t, s, o;
    WALIGN       u, t;
}
proto align_storei {in align u, in align* s, in immediate o} {vec8x20 t} {
    RALIGN       t, u;
    SV16.I       t, s, o;
}
proto vec8x20_loadi {out vec8x20 t, in vec8x20* p, in immediate o} {} {
    LV32.I              t, p, o;
    LVH.I               t, p, o+16;
}
proto vec8x20_storei {in vec8x20 t, in vec8x20* p, in immediate o} {} {
    SVL.I               t, p, o;
    SVH.I               t, p, o+16;
}
```

The align_loadi proto directive defines the instruction stream necessary to load a value into the alignment register file. Note that the LV16.I and WALIGN instructions require the use of a vec8x20 typed register (a vec register). In the same way, the align_storei directive defines the instruction stream necessary to save a value from the align register file. In the same way, the storei directive uses instructions that require the use of a vec8x20 register. Both saving and restoring an align value requires the use of a free vec8x20 register.

Note that if each type is considered a node and each dependency is considered an edge then this example forms a graph with the set of nodes {align, vec8x20} and the set of edges {(align, vec8x20)}. The TIE compiler parses the source above and forms a dependency graph from the declarations. It then checks this graph for circular dependencies through standard graph algorithms known in the art such as the kind in *Introduction to Algorithms* (Cormen, Leiserson and Rivest). The TIE compiler then generates C code that represents these non-circular proto directives. The TIE compiler further encodes the save and restore instructions themselves into this C code. This C code is compiled into a libcc file.

Libdb loads the libcc and accesses the encoded dependency information. To generate the save information for an align register, libdb looks at the proto information for the align register that was put into the libcc by the TIE compiler. This information gives both the instructions and the dependencies. Seeing that there is a dependency on the vec8x20 type, libdb first generates a set of instructions (from the instruction information encoded in the libcc file by the TIE compiler) to save a vec8x20 register. It then generates a set of instructions, using this saved vec8x20 register to save the alignment register. Finally it generates a set of instructions to restore the vec8x20 register from the save locations. This is because the saving of the state is not guaranteed to leave the values of the intermediate registers intact. As a consequence, the intermediate values must be restored so that the operation does not disturb the state of the processor.

To summarize: GDB gets the save and restore sequence from libdb while libdb generates the save and restore sequence by using information that has been produced by the TIE compiler. The TIE compiler is a part of the processor generator. Of course, the whole reason that GDB is requesting information about a particular register's value is that source level debuggers are showing the state of the processor to the user. Compilers (and in this case, the xt-gcc Xtensa-C/C++ compiler used to generate the configurable processor architecture) not only generate machine code from source code, but also generate extra information to tell tools such as debuggers where a given piece of state is stored at any given time. When the user wishes to view a particular piece of state in code, the debugger looks at this extra information to determine where that information is stored. Sometimes the information is in memory and the debugger reads the state from memory. Sometimes, however, the state is in registers and the debugger must read the state directly from the register. It is also worth noting that users can directly request the register information and this can be of direct use to the user.

Users of GDB can remotely debug an Xtensa processor with the monitor XMON. XMON is the Xtensa monitor program and runs on Xtensa processors. The details of the XMON monitor involve the intricacies of the Xtensa architecture so please refer to the Xtensa Instruction Set Architecture Reference Manual, incorporated by reference, for details. Source code for a version of XMON is included in Appendix A.

XMON is a software debugging monitor that uses the processor to access the state of the processor for GDB.

Figure 1:
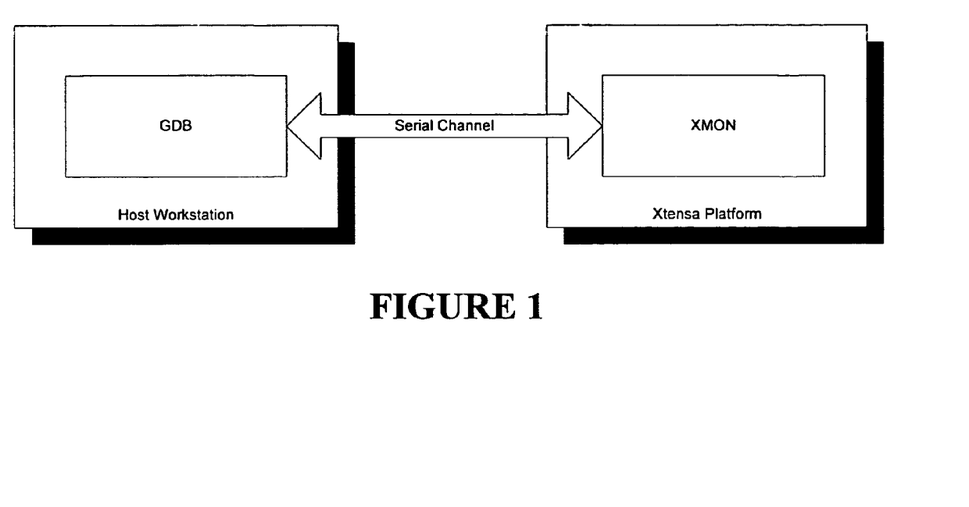
FIG. 1 is a diagram of GDB/XMON system topology according to a preferred embodiment of the present invention.

XMON communicates with GDB over a serial link. XMON remains the same for versions of the processor that have different state and instructions to retrieve that state (see FIG. 1). XMON is kept the same to lower the amount of work required to deliver a running system. Building a new monitor requires burning new ROMs to install that monitor and there is an efficiency to having a single monitor that can service multiple processor configurations. Though changes to other aspects of the processor can require a new XMON to be built, a given XMON works properly for all possible additional state and state retrieving instructions. Changes that require a new XMON to be built are changes that affect the communication mechanisms that XMON uses or changes that affect the actual format of the core instructions that the processor can execute. For example, XMON depends on the serial port to communicate with the host debugger. That serial port is connected to an interrupt on the processor and that interrupt has a particular interrupt level in the processor. Both the interrupt and the interrupt level are configurable by the user. If the user changes either of these parameters for the serial port interrupt, a new XMON must be built. Xtensa processors can also be configured to execute either in a big-endian or a little-endian format. Depending on the configuration, the encoding of the instructions changes. As a consequence, a new XMON must be built when the processor endianness is changed.

GDB retrieves new state of the processor from XMON by getting the save sequence for that state from libdb. The communication protocol for communications between GDB and XMON is shown in the tables below.

TABLE I

| Command | Description | Response |
| --- | --- | --- |
| ? | Returns the most recent signal received from the target which can be one of: GDB_SIGINT GDB_SIGQUIT GDB_SIGILL GDB_SIGTRAP GDB_SIGIOT GDB_SIGBUS GDB_SIGFPE GDB_SIGSEGV GDB_SIGALRM GDB_SIGTERM | SXX |
| pRRR . . . R | Read a single register whose number is RRR . . . R. The way registers are numbered is implementation and configuration dependent. | XXX . . . X |
| PRRR . . . R=XXX . . . X | Write the value XXX . . . X into a single register whose number is RRR . . . R. | OK E<message> |
| mAAA . . . A, LLLL; | Read the LLLL bytes from address AAA . . . A on the target. Return the contents as a hex string. | XXX . . . X |
| MAAA . . . A, LLLL:XXX . . . X | Write LLLL bytes at address AAA . . . A. The value to be written is the hex string XXX . . . X. | OK E<message> |
| c | Continue execution at the current pc. Respond with the reason code <NN> when program stops. | S<NN> E<message> |
| s | Step one instruction, and return the reason code <NN> (in unix lingo, the signal value) that caused it to stop. If the step succeeded NN=05. | S<NN> E<message> |
| K | Not implemented | |

TABLE I-continued

| Command | Description | Response |
| --- | --- | --- |
| Xqn | This command exists for two reasons. First, xt-gdb issues this command to determine what the kind of target it has connected to. XMON responds with the string "XMON" identifying its version to xt-gdb. This version number is particularly important since xt-gdb will adjusts its register numbering to match the version of XMON. | XMON1.5 XMON2.0 XOCD ISS ISS3 |
| XqpXXXXXXXX | Queries the target to see if the target "knows" how to fetch the specified register | Y N |
| XqPXXXXXXXX | Queries the target to see if it knows how to set the specified register | Y N |
| XexeXX:YY:ZZ | Executes an arbitrary opcode on the target. The OCD daemon does byteswapping for bigendian targets. | NULL string |
| Xsbe [0 | 1] | Tells the OCD daemon that the target is big endian, or little endian. | NULL string |
| XsisXX | Sets the cache line size. This is used so that when the OCD daemon is accessing memory,it can do cache flush instructions on the appropriate byte boundaries, or skip the cache flush instructions in the case of not having an instruction cache. | NULL string |
| Xcs | Toggles stack spilling on and off. By default the xocd daemon will spill the AR register file to the stack. This makes doing stack traces quick and easy, but can make some forms of debugging not work correctly. This toggles the stack spill policy. Use this with extreme caution. | OK |
| XwgrXX:name: YYYYYYYY | Writes a "generic" tap's, tap register, where XXX is the device number on the jtag chain, name is the name of the register as specified in the topology.ini file, and YYYY is the value being written. | OK E:ERROR WRITING Register |
| XqgrXXXX:name | Reads a "generic" tap's tap register. XX is the device number on the jtag chain, and name is the name of the tap's register as specified in the topology.ini file. | OK E:ERROR Reading Register |

An extended protocol shown in TABLE II offers more usability. For instance, the extended protocol will support breakpoints in ROM while the base protocol cannot, as all breakpoints are implemented by writing a break instruction into memory.

TABLE II

| Command | Description | Response |
|---|---|---|
| g | Request that target to return the contents of all known registers. The reply is a hex string; each pair of digits represents a byte; and the byte are sequenced in target byte order. The values of all the registers are appended to form the string. The ordering of a particular registers in this string is implementation dependent. | XXXXXX . . . XXXXX |
| GXXXXX . . . XXXX | The reverse of the above, i.e. decode the hex string and write all the registers with new contents. The target should respond with OK or an error message. | OK<br>E<message> |
| mAAA . . . A, LLLL; | Read the LLLL bytes from address AAA . . . A on the target Return the contents as a hex string. | XXXX . . . X |
| MAAA . . . A, LLLL:XXX . . . X | Write LLLL bytes at address AAA . . . A. The value to be written is the hex string XXX . . . X. | OK<br>E<message> |
| s | Step one instruction, and return the reason code <NN> (in unix lingo, the signal value) that caused it to stop. If the step succeeded NN=05. | S<NN><br>E<message> |
| c | Continue execution at the current pc. Respond with the reason code <NN> when program stops. | S<NN><br>E<message> |
| pRRR . . . R | Read a single register whose number is RRR . . . R. The way registers are numbered is implementation and configuration dependent. | XXX . . . X |
| PRRR . . . R=XXX . . . X | Write the value XXX . . . X into a single register whose number is RRR . . . R. | OK<br>E<message> |
| Xqn | This command exists for two reasons. First, xt-gdb issues this command to determine what the kind of target it has connected to. Second, xt-gdb uses this command to requests information about registers from the simulator. The simulator will tell the gdb how many registers it knows about. XMON responds with the string "XMON" identifying its version to xt-gdb. This version number is particularly important since xt-gdb will adjusts its register numbering to match the version of XMON. | XMON1.5<br>XMON2.0 |

One of the messages in the basic protocol tells XMON that GDB is going to send a series of instructions over the serial port to XMON and that XMON should execute those instructions. GDB sends this message to XMON along with the instructions and in this way fetches the state of the processor even though the encoding of XMON knows nothing special about this extra state. XMON retrieves the state and sends it back to GDB across the serial channel.

Figure 2:
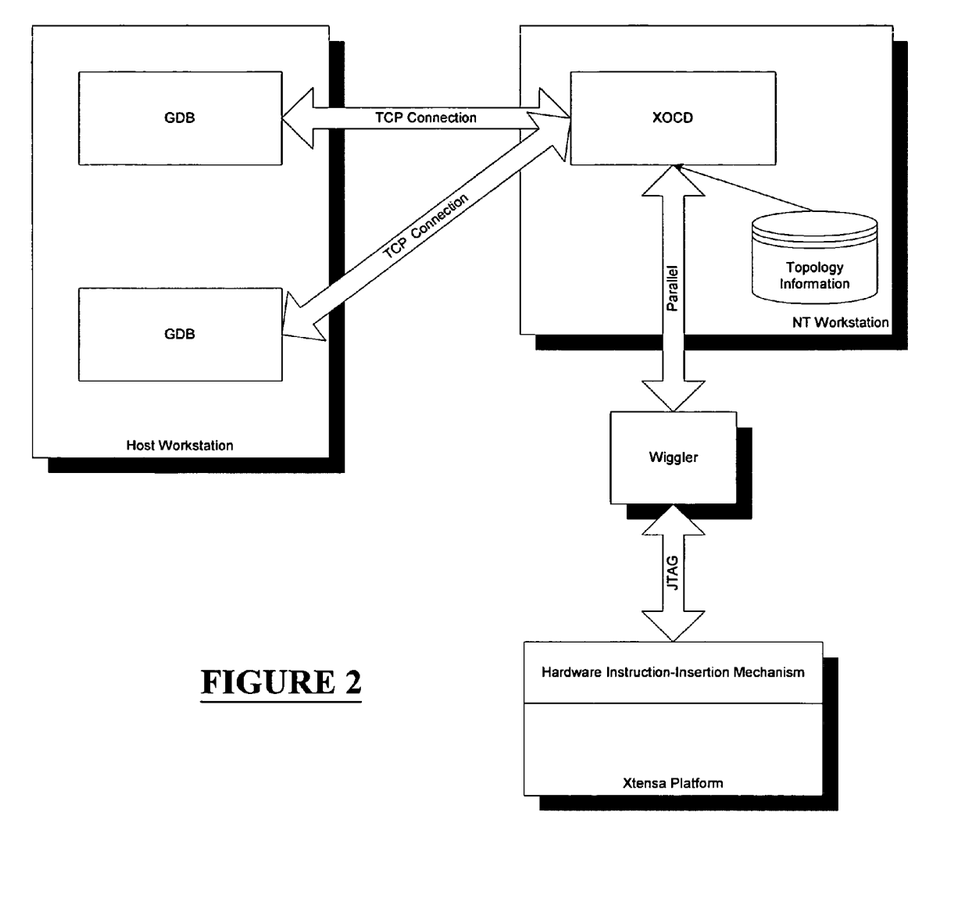
FIG. 2 is a diagram of GDB/XOCD system topology according to a preferred embodiment of the present invention.

Consider the following example of an exchange between GDB and the XMON monitor:

1. Query the target to see if it can access the specified register. The target replies with "n" meaning no.
  Sending packet: $Xqp10020001#bd . . . . Ack
  Packet received: n
2. This sequences sets the CPENABLE so that the processor has access to all the coprocessors.
  Sending packet: $p80000e0#fd . . . . Ack
  Packet received: 0000000e
  Sending packet: $P80000e0=0000000f#d0 . . . . Ack
  Packet received: OK
3. This saves the memory (4 bytes in this case) where the TIE register will be spilled.
  Sending packet: $m4005b150,4#8e . . . . Ack
  Packet received: 00000000
4. This saves the a4 register, which will be used as the addressing register. Then a4 is set to contain the address where the TIE register will be spilled.
  Sending packet: $p4000004#c8 . . . Ack
  Packet received: 40010088
  Sending packet: $P4000004=4005b150#a6 . . . Ack
  Packet received: OK
5. This sends the instruction to be executed, in this case, we use a4 for address, and are spilling register i321 (a user defined TIE register).
  Sending packet: $Xexe:31:41:00#71 . . . . Ack
  Packet received:

6. Now we read the memory at the location where the register was spilled. This should be the value of the register, and in this case the register contained the value zero which is what we read back.
Sending packet: $m4005b150,4#8e . . . . Ack
Packet received: 00000000
7. Now we restore a4, and the memory where we spilled the TIE register.
Sending packet: $P4000004=40010088#7a . . . Ack
Packet received: OK
Sending packet: $M4005b150,4:00000000#28 . . . Ack
Packet received: OK
8. Now we restore CPENABLE.
Sending packet: $P80000e0=0000000e#cf . . . . Ac
Packet received: OK Users of GDB can also remotely debug an Xtensa processor with the processor feature OCD. OCD is an instruction-insertion feature described in the Tensilica On-Chip Debug Mode User's Guide, incorporated by reference, and XOCD is a server that uses the OCD feature to access processor state. XOCD communicates with GDB across a TCP network connection and communicates with the hardware instruction-insertion mechanism through a special piece of hardware called "the wiggler." The wiggler connects to the parallel port of a PC and converts those signals to electrical signals appropriate for a JTAG connection (see FIG. 2). XOCD does not have to be rebuilt for different processor configurations. A single version of the XOCD software will service all processor configurations.

As with XMON, GDB retrieves new state of the processor from XOCD by getting the save sequence for that state from libdb. There is a communication protocol between GDB and XOCD. This protocol is the same protocol as for XMON (see TABLE I above). One of the messages in this protocol tells XMON that GDB is going to send a series of instruction over the serial port to the XOCD server and that the XOCD server should use the instruction insertion feature of the processor to execute those instructions.

Consider the following example of an exchange between GDB and the XOCD server:
1. Query the target to see if it can access the specified register. The target replies with "n" meaning no.
Sending packet: $Xqp 10020001 #bd . . . . Ack
Packet received: n
2. This sequences sets the CPENABLE so that the processor has access to all the coprocessors.
Sending packet: $p80000e0#fd . . . . Ack
Packet received: 0000000e
Sending packet: $P80000e0=0000000#d0 . . . Ack
Packet received: OK
3. This saves the memory (4 bytes in this case) where the TIE register will be spilled.
Sending packet: Sm4005b150,4#8e . . . . Ack
Packet received: 00000000
4. This saves the a4 register, which will be used as the addressing register. Then a4 is set to contain the address where the TIE register will be spilled.
Sending packet: $p4000004#c8 . . . . Ack
Packet received: 40010088
Sending packet: $P4000004=4005b150#a6 . . . . Ack
Packet received: OK
5. This sends the instruction to be executed, in this case, we use a4 for address, and are spilling register i321 (a user defined TIE register)
Sending packet: $Xexe:31:41:00#71 . . . Ack
Packet received:

6. Now we read the memory at the location where the register was spilled. This should be the value of the register, and in this case the register contained the value zero which is what we read back.
Sending packet: $m4005b150,4#8e . . . Ack
Packet received: 00000000
7. Now we restore a4, and the memory where we spilled the TIE register.
Sending packet: $P4000004=40010088#7a . . . Ack
Packet received: OK
Sending packet: $M4005b 150,4:00000000#28 . . . Ack
Packet received: OK
8. Now we restore CPENABLE
Sending packet: $P80000e0=0000000e#cf . . . . Ack
Packet received: OK Those instructions save the requested state of the processor into memory and then bring that data out through the scan chain (see the above-referenced On-Chip Debug Mode User's Guide Tensilica publication for a detailed explanation of the instruction-insertion mechanism for Xtensa processor cores).

Again, because GDB is transmitting the run-time generated instructions to XOCD across the network, XOCD does not have to be modified for each new processor configuration but works properly for each one.

It is also worth noting that GDB itself does not have to be modified for each configuration. Unlike the system described in the above-cited applications, using this system, one GDB can service all processor configurations by having libdb load the appropriate libraries (libcc's—dynamically linked libraries) that were created by the processor generator. In the previous system, a custom GDB was generated for each processor configuration. This had the drawbacks that the time to build the processor was increased and the amount of space required to store the tool chain was increased.

JTAG Overview

The JTAG specification (available from IEEE) specifies both an electrical and architectural interface. The intent of this interface is to give visibility into silicon systems without requiring lots of additional hardware resource. In particular, the JTAG interface is designed to use minimal silicon area and pins. Debugging hardware that uses JTAG can be considered to have a series of controllers that are connected together in a particular order.

Figure 3:
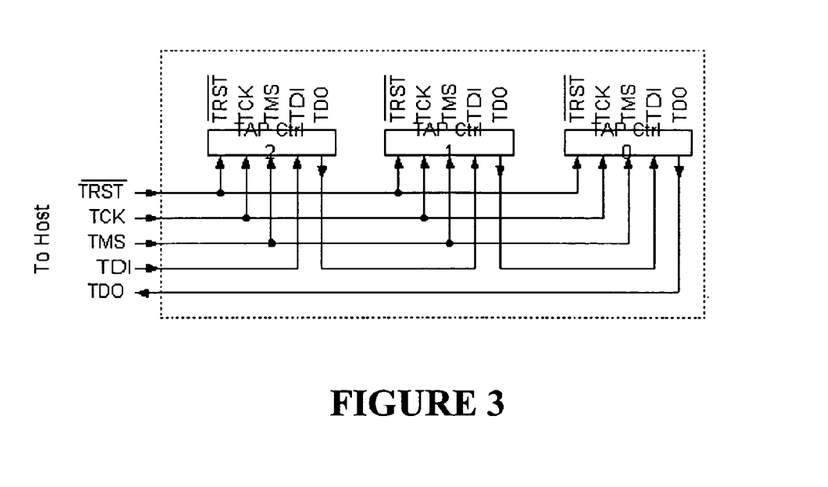
FIG. 3 is a diagram of a JTAG interface system topology according to a preferred embodiment of the present invention.

The data and control portion of the JTAG interface is a serial bit stream. Both instructions to be performed and the results of those instructions are transmitted over this serial bitstream. As different devices are connected to the same JTAG interface, the total length of the bit stream becomes longer. (See FIG. 3). Each of the objects on the scan chain is a set of logic called a TAP controller and the TAP controller accepts instructions from the serial interface.

Multiple Core Debugging

For a variety of reasons, monitors do not generally provide effective debugging solutions for multiple core debugging. One reason is addressability. The processor needs to know how to select and observe each core individually. However, monitor programs generally use communication channels that are difficult to aggregate and/or split. Take XMON as an example. XMON uses a serial port to communicate with GDB. Serial is a very simple protocol, but it is not designed to have more than two objects on the connection. One obvious solution is to have one serial port per processor, but in the case where many processor cores are implemented on a single piece of silicon, all of those serial ports either have to be aggregated, or each has to come out to pins on the package. The number of pins available on a package is limited and solutions that use fewer pins are superior.

WindRiver Systems' Tornado2.0 environment uses TCP for communication between the monitor and the debugging software. While network connections are easy to aggregate and split, the amount of hardware required to implement this solution is reasonably high and is not efficient on the scale that would be necessary to make them viable for multiple cores on a single piece of silicon.

The IEEE JTAG specification provides an interface that is easy to aggregate, easy to split and reasonable in size. Instruction-insertion mechanisms such as OCD on the Xtensa core tend to use the JTAG interface. In the preferred embodiment, the processor cores are connected together serially in a JTAG chain. The XOCD server is connected to the end point of this chain.

The XOCD server (described in greater detail in the aforementioned Tensilica On-Chip Debug Mode User's Guide) controls the instruction insertion mechanism by shifting bits into the JTAG scan chain one bit at a time. Because a bit will go from one bit in a register to another bit in a register, and finally to the first bit in the next register, the XOCD server has to know where the processor is in the chain to be able to address a given processor. The simplest way to do this would be to build a custom XOCD server for each system topology. But this solution has a series of drawbacks. A different XOCD server would have to be built and installed for each processor because the XOCD servers would be different for each processor or system of processors.

In the preferred embodiment, a generic XOCD server reads a file that specifies the topology of the system of configurable processors. This file includes information about position in the scan chain for each processor as shown in TABLE III below.

TABLE III

| Section | Key | Description |
|---|---|---|
| [main] | Number_of_xtensas | Number of Xtensa processors in the scan chain. |
|  | Number_of_generic | Number of instances of the generic TAP controller. |
|  | Number_of_other | Number of other (bypassed) TAP controllers |
| [generic_description] | IR_Width | Instruction register length in bits. |
|  | Bypass | Bypass instruction |
|  | Bypass_length | Bypass data register length |
|  | Number_of regs | Number of accessible data registers |
| [generic_reg_X] | Gdb_name | Name given to the data register for the debugger access. |
|  | Width | Data register width in bits. |
|  | Read_Instruction | Instruction that selects the data register |
|  | Write_Instruction | Instruction that selects the data register (if writable) |
| [xtensa_X] | Position | Position of the Xtensa on the TAP chain. |
| [genric_X] | Position | Position of the generic TAP instance on the chain. |

TABLE III-continued

| Section | Key | Description |
|---|---|---|
| [other_X] | Position | Position of the bypassed TAP controller on the chain. |
|  | IR_Width | Instruction register length in bits. |
|  | Bypass | Bypass instruction. |
|  | Bypass_length | Bypass data register length. |

To best understand the use of the topology file, let us consider several files. First a file that has only a single processor on the scan chain.

[main]
number_of_xtensas=1
number_of_generic=0
number_of_other=0
[xtensa0]
position=0

Clearly there is not much to say about this example. With only one Xtensa, and no other JTAG TAP interfaces on the chain, the Xtensa must be at position 0.

In the next example, there are two Xtensa processors.
[main]
number_of_xtensas=2
number_of_generic=0
number_of other=0
[xtensa0]
position=1
[xtensa1]
position=0

This example illustrates that the position of the processor does not have to match the numbering of the processor. When GDB connects to the XOCD server, it connects to a particular TCP/IP socket that is listened to by the XOCD server. That socket corresponds to the Xtensa number rather than the position number.

Of course, a scan chain can have more than just processor controllers on it. In the preferred embodiment, the topology file also specifies additional controllers. This specification includes both their impact on the scan chain, their basic accessibility information and their architectural information. The XOCD server takes this information and allows multiple instances of one particular TAP controller architecture to be addressed by the debugger. This allows the user to access state that is not associated with the processor core, but is instead associated with the surrounding system.

In the next example, the two Xtensa processors are joined by an additional TAP controller that is not an Xtensa TAP controller.
[main]
number_of xtensas=2
number_of generic=1
number_of other=0
[xtensa0]
position=1
[xtensa1]
position=0
[generic_description]
IR Width=5
bypass=0x1f
bypass_length=1
number_regs=2
[generic_reg_0]

```
gdb_name=MOTOR_SPIN
Width=2
Read_Instruction=0x17
Write_Instruction=0x18
[generic_reg_1]
gdb_name=SPIN_RATE
Width=32
Read_Instruction=0x19
Write_Instruction=0x20
[generico]
position=2
```

The additional TAP controller is a "generic" TAP controller that is defined to have two registers, the MOTOR_SPIN register and the SPIN_RATE register. The definitions of these registers include all the information that is necessary for the XOCD server to access these registers and return the information to the user.

In the final example, the two Xtensa processors are joined by an additional TAP controller that is not accessible to the XOCD server. The user has only described enough information about the TAP controller for the XOCD server to be able to use the scan chain. The particulars of the TAP itself are not described. This contrasts with the description of the above TAP controller.

```
[main]
number_of_xtensas=2
number_of_generic=0
number_of_other=1
[xtensa0]
position=1
[xtensa1]
position=0
[other0]
position=2
IR Width=5
bypass=0x1f
bypass_length=1
```

Note that many other TAP controllers can be on the chain. For full information about supported scan chain topologies, refer to the Tensilica On-Chip Debug Mode User's Guide.

The preferred embodiments described above have been presented for purposes of explanation only, and the present invention should not be construed to be so limited. Variations on the present invention will become readily apparent to those skilled in the art after reading this description, and the present invention and appended claims are intended to encompass such variations as well.

What is claimed is:

1. A method of accessing state from a configurable processor, the method comprising:
   preparing a first state-accessing instruction stream based on a first user description of the configurable processor;
   transmitting, using a debugger, the first state-accessing instruction stream to an interpreting agent, the interpreting agent being capable of interpreting that stream;
   causing, using the first state-accessing instruction stream, the interpreting agent to return the state of a first configuration of the configurable processor to the debugger
   preparing a second different state-accessing instruction stream based on a second different user description of the configurable processor;
   transmitting, using the debugger, the second state-accessing instruction stream to the interpreting agent, the interpreting agent also being capable of interpreting that second stream; and
   causing, using the second state-accessing instruction stream, the interpreting agent to return the state of a second different configuration of the configurable processor to the debugger.

2. A method as in claim 1 where the interpreting agent is a monitor program.

3. A method as in claim 1 where the interpreting agent is an instruction insertion server.

4. A method as in claim 1 where the interpreting agent is an architectural simulator.

5. A method as in claim 1, wherein the steps of preparing the first and second state-accessing instruction streams include:
   reading, using the debugger, information describing the first and second configurable processor's state architecture, respectively; and
   generating, using the debugger, the first and second instruction streams, respectively, based on the information.

6. A method as in claim 5 wherein the interpreting agent is a monitor program.

7. A method as in claim 5 wherein the interpreting agent is an instruction insertion server.

8. A method as in claim 5 wherein the interpreting agent is an architectural simulator.

9. A computer-readable storage medium storing therein a software program comprising:
   software for automatically generating a hardware description of a configurable processor from a user description of that processor; and
   a debugger library for automatically generating information necessary to describe save and restore instruction for state of the configurable processor based on the user description; and
   a debugger which is capable of requesting in interpreting agent to access state from the configurable processor using a state-accessing stream that is based on the user description, the interpreting agent being capable of interpreting the stream and returning the state of the configurable processor in response thereto.

10. A computer-readable storage medium according to claim 9, wherein the debugger library is further for:
    reading a description of save and restore state information of the configurable processor; and
    generating saving and restoring state instruction streams that are capable of being executed on the configurable processor based on the description.

11. A medium as in claim 10 wherein the debugger library further comprises functionality for:
    identifying interdependencies in a state that has been added to the configurable processor based on a user description; and
    generating a complete and correct save and restore sequence based on the interdependencies.

12. An instruction-insertion server comprising:
    means for interpreting both first and second different state-accessing instruction streams, the first and second instruction streams being generated based on first and second different user descriptions of a configurable processor, respectively;
    means for retrieving system topology information of a chip containing multiple cores from a computer-readable file; and
    means for determining where first and second cores corresponding the first and second different user descriptions are in a system described by the file; and means responsive to the determining means for directing the first and second state-accessing instruction stream to the first and second cores, respectively.

13. A system for accessing state from a configurable processor, the system comprising:
   a debugger which transmits a state-accessing instruction stream;
   an interpreting agent which
   receives the instruction stream,
   interprets the instruction stream to access state of the configurable processor, and
   returns the accessed state of the configurable processor to the debugger,
   wherein the interpreting agent is capable of interpreting both first and second ones of the state-accessing instruction streams which access state of first and second different configurations of the configurable processor, respectively, the first and second configurations being generated based on first and second different user descriptions of the configurable processor.

14. A system as in claim 13 where the interpreting agent is a monitor program.

15. A system as in claim 13 where the interpreting agent is an instruction insertion server.

16. A system as in claim 13 where the interpreting agent is an architectural simulator.

17. A system as in claim 13, wherein the debugger is adapted to:
   read information describing the configurable processor's state architecture; and
   generate the instruction stream based on the information.

18. A system as in claim 17 wherein the interpreting agent is a monitor program.

19. A system as in claim 17 wherein the interpreting agent is an instruction insertion server.

20. A system as in claim 17 wherein the interpreting agent is an architectural simulator.

* * * * *